(12) United States Patent
Kakuishi et al.

(10) Patent No.: US 6,881,474 B2
(45) Date of Patent: Apr. 19, 2005

(54) MAGNETIC TAPE POSSESSING A CONTROLLED RADIUS OF CURVATURE IN THE WIDTH AND LONGITUDINAL DIRECTIONS

(75) Inventors: Yutaka Kakuishi, Odawara (JP); Masatoshi Takahashi, Odawara (JP); Minoru Sueki, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/206,201

(22) Filed: Jul. 29, 2002

(65) Prior Publication Data

US 2003/0022021 A1 Jan. 30, 2003

Related U.S. Application Data

(63) Continuation of application No. 09/369,890, filed on Aug. 9, 1999, now abandoned.

(30) Foreign Application Priority Data

Aug. 7, 1998 (JP) .......................................... 10-236339

(51) Int. Cl.$^7$ ................................................ G11B 5/73
(52) U.S. Cl. ....................... 428/212; 428/216; 428/220; 428/323; 428/336; 428/337; 428/522; 428/694 BS; 428/694 BB; 428/694 SL
(58) Field of Search ................................ 428/212, 216, 428/220, 323, 336, 337, 522, 694 BS, 694 BB, 694 SL, 694 R, 213, 215, 330, 900

(56) References Cited

U.S. PATENT DOCUMENTS

| | | | | |
|---|---|---|---|---|
| 4,318,957 A | * | 3/1982 | Videc | 428/298.1 |
| 4,489,124 A | * | 12/1984 | Watanabe | 428/220 |
| 4,804,736 A | | 2/1989 | Utsumi | |
| 4,917,959 A | | 4/1990 | Kasanuki | |
| 5,958,565 A | | 9/1999 | Hattori et al. | |

FOREIGN PATENT DOCUMENTS

| | | | |
|---|---|---|---|
| JP | 05-307731 A | * | 11/1993 |
| JP | 10-134337 A | | 5/1998 |
| JP | 10-134343 A | * | 5/1998 |

OTHER PUBLICATIONS

JPO Abstract Translation of JP 10–134343 A (Document ID: JP 10134343 A).*
Machine Translation of JP 10–134343 A.*
JPO Abstract Translation of JP 05–307731 A (Document ID: JP 05307731 A).*
Machine Translation of JP 05–307731 A.*
IBM Technical Disclosure No.: NN640216.*
English Translation of Tokkyo Kokai JP 10–134,337A (Yashushi Hottori et al).
JPO Abstract Translation of Tokkyo Kokai 09–293229A (Clipped Image No. JP409293229A).
JPO Abstract Translation of Tokkyo Kokai 09–305952A (Clipped Image No. JP409305952A).
JPO Abstract Translation of Tokkyo Kokai 10–011736A (Clipped Image No. JP410011736A).
JPO Abstract Translation of Tokkyo Kokai 10–02733A (Clipped Image No. JP410027333A).
JPO Abstract Translation of Tokkyo Kokai 10–134343A (Clipped Image No. JP410134343A).
Derwent Abstract Translation of JP 10–134337 (Derwent Acc. No. 1998–352768).

* cited by examiner

Primary Examiner—Kevin M. Bernatz
(74) Attorney, Agent, or Firm—Sughrue Mion, PLLC

(57) ABSTRACT

A magnetic tape favorably employable for recording computer data, comprising a support web, a magnetic layer and a back-coat layer and having a thickness of 3 to 10 $\mu$m, should have a curl having a radius of curvature of greater than 10 mm in its longitudinal direction and a curl having a radius of curvature of greater than 40 mm in its width direction, wherein the curl in the width direction gives a convex surface on the side of the magnetic layer.

16 Claims, 1 Drawing Sheet

MAGNETIC TAPE POSSESSING A CONTROLLED RADIUS OF CURVATURE IN THE WIDTH AND LONGITUDINAL DIRECTIONS

This is a continuation of application Ser. No. 09/369,890, filed Aug. 9, 1999; now abandoned, the disclosure of which is incorporated herein by reference.

FIELD OF THE INVENTION

This invention relates to a magnetic tape which is advantageously employable as an external medium for recording computer data.

BACKGROUND OF THE INVENTION

Recently, magnetic recording-reproducing systems employing external media (such as magnetic tapes, particularly, back-up tapes) for computer data have been desired to record the data in a high density. Therefore, it becomes common to use recording signals having a shorter wavelength and recording tracks having a narrower width. Further, in order to rapidly process a great number of data, the processing speed for recording or reproducing the data is accelerated. On the other hand, for attaining a large storage capacity, thinner magnetic tapes such as those having a total thickness in the range of from 3 to 30 µm are widely used. Accordingly, it is desired for the thin magnetic tapes to have high running durability. In the system for high density recording, even a small distortion of the tape often prevents the magnetic tape from smooth running, and further gives an adverse influence to contact between the magnetic tape and a magnetic head so as to impair the output. For this reason, it is also desired for the thin magnetic tape to be resistant to distortion and deformation.

In general, a magnetic tape comprises a flexible support web (e.g., plastic support web) and a magnetic layer provided thereon. For attaining the high density recording, a non-magnetic layer and a thin magnetic layer may be superposed in order on the support. The magnetic layer preferably has a smoother surface to show higher output signals, but the smooth surface often causes troubles in the procedure of winding or running. To avoid the troubles, a back-coat layer is generally provided on the support surface opposite to the magnetic layer. Japanese Patent Provisional Publications No. 5(1993)-217146 and No. 6(1994)-215350, for example, disclose a magnetic tape comprising a magnetic layer on one surface of the support and a back-coat layer on the other surface. Further, Japanese Patent Provisional Publication No. 5(1993)-182178, for example, discloses a magnetic tape comprising a non-magnetic layer and a thin magnetic layer superposed in order on one surface of the support, and a back-coat layer on the other surface.

Since a thin magnetic tape has relatively weak rigidity as compared with a thick one, it is often curled in its longitudinal direction and/or width direction by receiving stress of stretching, compressing or drying in the production process. The curl in the longitudinal direction (which is generally called "coiling") is often produced by the presence of voids in the magnetic layer. In more detail, the voids are compressed in the calendering process, and then expand to curl the magnetic tape giving a convex surface on the side of the magnetic layer. On the other hand, the curl in the width direction (which is generally called "cupping") is often produced by residual stress having been applied to the binder of the back-coat layer. When the binder shrinks, the shrunken binder has the residual stress, which thereafter generates a convex surface on the side of the magnetic layer.

The present inventors studied on the curls of a thin magnetic tape and their influence upon electromagnetic characteristics and handling of the magnetic tape, and finally found the following facts.

In the recently developed magnetic recording systems employing thin magnetic tapes, the magnetic tapes are run under a low tension. Accordingly, the curls of the magnetic tape sometimes cause undesirable effects. The curl in the longitudinal direction of the magnetic tape reduces the contact between the running magnetic tape and the magnetic head to impair the electromagnetic output. Further, the curl has an adverse influence on the handling in the process of producing the magnetic tape. Particularly in the step for slitting, the curl often distorts a slit magnetic tape and makes it very difficult to smoothly wind up the magnetic tape. The curl in the width direction sometimes also causes winding troubles, and further at the edge of the magnetic tape the contact with the magnetic head is reduced to impair the electromagnetic output. Further, when the magnetic tape has a curl in the width direction, it becomes difficult for guide apparatuses to give good control on the magnetic tape running so that the tape may move vertically while running so as to cause off-tracks. Particularly, when nitrocellulose (which is a relatively hard resin) is used as a binder in the back-coat layer, the curl in the width direction is sometimes produced and accordingly the electromagnetic output is sometimes impaired.

Japanese Patent Provisional Publication No. 5(1993)-307731 discloses a magnetic tape improved in the curl in the width direction. In the disclosed magnetic tape, the degree of curl in the width direction (i.e., amount of convex curvature on the magnetic layer side) is adjusted within 0.3 to 0.7 mm per ½ inch width (which corresponds to a radius of curvature of 56 to 29 mm). According to the description of the publication, that magnetic tape (having a thin thickness) neither impairs the output nor shows drop-out, and hence exhibits good electromagnetic characteristics. Further, the publication tells that the magnetic tape has enough running durability against distortion or damage. Thus, the publication refers to the problems caused by the curl in the width direction, but is silent with respect to problems caused by the curl in the longitudinal direction.

It is an object of the present invention to provide a magnetic tape suitably employable in the magnetic recording-reproducing systems for storing the data (particularly, computer data) in a high density. It is another object of the invention to give a magnetic tape showing excellent electromagnetic characteristics, good handling property, and high running durability.

SUMMARY OF THE INVENTION

The present invention resides in a magnetic tape having a thickness of 3 to 10 µm, which comprises a support web, a magnetic layer which is placed on a surface on one side of the support web and comprises a ferromagnetic powder and a binder, and a back-coat layer which is placed on a surface on another side of the support web and comprises carbon black and a binder, which shows a curl having a radius of curvature of greater than 10 mm in its longitudinal direction and a curl having a radius of curvature of greater than 40 mm in its width direction, said curl in the width direction giving a convex surface on the side of the magnetic layer.

The invention further resides in a magnetic tape having a thickness of 3 to 10 µm, which comprises a support web, a non-magnetic layer which is placed on a surface on one side of the support web, has a thickness of 0.3 to 2.5 µm and comprises a non-magnetic powder and a binder, a magnetic layer which is placed on the non-magnetic layer, has a thickness of 0.05 to 1.0 μm and comprises a ferromagnetic powder and a binder, and a back-coat layer which is placed on a surface on another side of the support web which comprises carbon black and a binder, which shows a curl having a radius of curvature of greater than 10 mm in its longitudinal direction and a curl having a radius of curvature of greater than 40 mm in its width direction, said curl in the width direction giving a convex surface on the side of the magnetic layer.

In the present specification, the radius of curvature in the curl in the longitudinal direction is determined in the following manner. The magnetic tape is cut into a strip having the length of 1 m. One end of the strip is fixed, and the other is made free. Then, the strip is suspended for 3 hours under the testing conditions (23° C.±2° C., 50%±10% RH). From the strip, the portion between the center and 35 mm below is cut out to prepare a sample. The sample is stood on a plane under the condition that its one side edge is brought into contact with the plane, and allowed to show the curl in the longitudinal direction. The radius of curvature in the formed curl is measured.

The radius of curvature in the curl in the width direction is determined in the following manner. The magnetic tape having is cut into a strip having the length of 1 m. One end of the strip is fixed, and the other is made free. Then, the strip is suspended for 3 hours under the testing conditions (23° C.±2° C., 50%±10% RH). From the strip, the upper portion of 250 mm and the lower portion of 250 mm are cut off to prepare a sample of 500 mm length. One end of the sample is fixed so that the magnetic layer side may be upside, and a 3.5 g weight is connected at the other end. As shown in FIG. 1, the sample is then strained via a roller (diameter: 10 mm). The distance between the fixed end and the center of the roller is adjusted at 200 mm. At the position of 100 mm from the fixed end, the distance from the center line to one side edge is measured by laterally scanning an optical displacement meter. From the obtained distance and the width of the tape, the radius of curvature of the curl in the width direction is calculated.

The preferred embodiments of the invention are as follows.

(1) The longitudinal curl (i.e., curl in the longitudinal direction) has a radius of curvature of not less than 14 mm (more preferably not less than 17 mm, further preferably not less than 20 mm, particularly preferably not less than 25 mm).

(2) The width curl (i.e., curl in the width direction) has a radius of curvature of not less than 45 mm (more preferably not less than 60 mm, further preferably not less than 100 mm, particularly preferably not less than 150 mm).

(3) In the support web, the ratio of the Young's modulus in the longitudinal direction to the Young's modulus in the width direction is in the range of 1.1 to 1.8 (more preferably 1.2 to 1.8, further preferably 1.3 to 1.8).

(4) The support web has a Young's modulus of 750 to 950 kg/mm$^2$ (more preferably 780 to 950 kg/mm$^2$, further preferably 850 to 950 kg/mm$^2$) in the longitudinal direction.

(5) The support web has a thickness of 2.0 to 8.0 μm (more preferably 3.0 to 7.0 μm, further preferably 4.0 to 6.5 μm).

(6) The support web is made of polyethylene terephthalate.

(7) The binder in the back-coat layer contains nitrocellulose resin, phenoxy resin and/or vinyl chloride resin.

(8) The back-coat layer has a thickness of 0.1 to 1.0 μm (more preferably 0.2 to 0.8 μm, further preferably 0.3 to 0.6 μm).

(9) The back-coat layer contains carbon black and an inorganic material powder having Mohs' scale of hardness of 5 to 9.

(10) The carbon black comprises a combination of two kinds of carbon blacks having different mean particle sizes. One carbon black comprises relatively fine particles having a mean particle size of 10 to 20 mμ, and the other comprises relatively crude particles having a mean particle size of 230 to 300 mμ.

(11) The inorganic material powder having Mohs' scale of hardness of 5 to 9 is a powder of α-alumina or α-iron oxide.

(12) The magnetic tape has a total thickness of 4.0 to 9.5 μm (more preferably 4.5 to 9.0 μm, further preferably 5.0 to 8.5 μm).

(13) The magnetic tape is desired for the use of recording computer data.

DETAILED DESCRIPTION OF THE INVENTION

Figure 1:
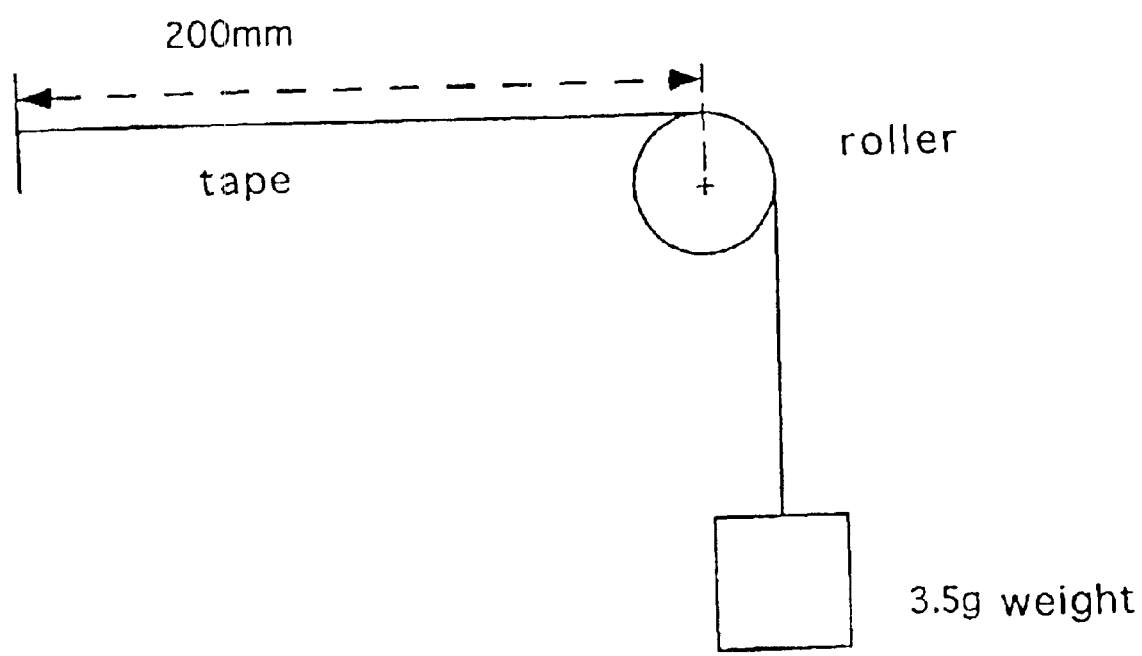
FIG. 1 schematically illustrates the method for measuring the radius of curvature of the curl of the magnetic tape in its width direction.

The magnetic tape of the invention is characterized by exhibiting a longitudinal curl having a radius of curvature of not less than 10 mm, and a width curl making the surface on the magnetic layer side convex and having a radius of curvature of not less than 40 mm. The longitudinal curl preferably has a radius of curvature of not less than 14 mm (more preferably not less than 17 mm, further preferably not less than 20 mm, particularly preferably not less than 25 mm). The width curl preferably has a radius of curvature of not less than 45 mm (more preferably not less than 60 mm, further preferably not less than 100 mm, particularly preferably not less than 150 mm).

One embodiment of the invention comprises a support web, and on one surface of the support, a magnetic layer comprising a ferromagnetic powder and a binder, and on the other surface, a back-coat layer comprising carbon black and a binder. This is the first embodiment.

Another embodiment comprises a support web, and on one surface of the support, an essentially non-magnetic layer (thickness: 0.5 to 2.5 μm) comprising a non-magnetic powder and a binder, and a magnetic layer (thickness: 0.05 to 1.0 μm) comprising a ferromagnetic powder and a binder superposed in order, and on the other surface, a back-coat layer comprising carbon black and a binder. This is the second embodiment.

First, the magnetic tape of the first embodiment is explained below. The support web, the magnetic layer and the back-coat layer are described in order.

As the material for the support web of the invention, materials used for those of the conventional magnetic tapes are employable. Particularly, non-magnetic materials are preferred. Examples of the materials include polyesters (e.g., polyethylene terephthalate (PET), polyethylene naphthalate (PEN), a mixture of polyethylene terephthalate and polyethylene naphthalate, copolymer comprising both ethylene terephthalate component and ethylene naphthalate), polyolefins (e.g., polypropylene), cellulose derivatives (e.g., cellulose diacetate, cellulose triacetate), polycarbonate, polyamides (e.g., aromatic polyamide, aramid), and polyimides (e.g., aromatic polyimide). Polyethylene naphthalate (PEN) is preferred. For the support web, the ratio of the Young's modulus in the longitudinal direction to the Young's modulus in the width direction preferably is in the range of 1.1 to 1.8 (more preferably 1.2 to 1.8, further preferably 1.3 to 1.8). Preferably, the Young's modulus in the longitudinal direction is in the range of 750 to 950 kg/mm$^2$ (more preferably 780 to 950 kg/mm$^2$, further preferably 850 to 950 kg/mm$^2$). The support web preferably has a thickness of 2.0 to 8.0 μm (more preferably 3.0 to 7.0 μm, further preferably 4.0 to 6.5 μm).

The magnetic layer basically comprises a ferromagnetic powder and a binder, and may further contain a lubricant, an electroconductive powder (e.g., carbon black) and an abrasive. Examples of the ferromagnetic powders include γ-Fe$_2$O$_3$, Fe$_3$O$_4$, FeO$_x$ (x=1.33 to 1.5), CrO$_2$, γ-Fe$_2$O$_3$ containing Co, FeO$_x$ (x=1.33 to 1.5) containing Co, ferromagnetic metal (alloy) powder, and tabular hexagonal ferrite powder. Ferromagnetic metal powder and tabular hexagonal ferrite powder are preferred. Particularly preferred is ferromagnetic metal powder.

The ferromagnetic metal powder preferably has a specific surface area of 30 to 70 m$^2$/g, and a crystallite size of 50 to 300 angstroms (which is determined by X-ray diffraction method). If the specific surface area is too small, the magnetic tape can not record the data in a high density. A ferromagnetic powder having a too large specific surface area is not dispersed well. Therefore, a magnetic layer employing such ferromagnetic powder of extremely large specific surface are can not have a surface smooth enough to record the data in a high density.

It is necessary for the ferromagnetic metal powder to contain Fe. The ferromagnetic metal powder mainly comprises Fe—Co, Fe—Ni, Fe—Zn—Ni or Fe—Ni—Co, or may comprise Fe alone. In order to ensure high density recording, the ferromagnetic metal powder preferably has a saturation magnetization (saturation magnetic flux density: σs) of not less than 110 emu/g (more preferably 120 to 170 emu/g), as well as a coercive force (Hc) of 1,400 to 2,500 Oe (preferably, 1,500 to 2,400 Oe). The ferromagnetic metal powder generally has a major axis length (i.e., mean particle size) of not more than 0.5 μm (preferably 0.01 to 0.3 μm), and an axis ratio (ratio of major axis length to minor axis length, i.e., aspect ratio) of 5 to 20 (preferably 5 to 15). The lengths of the axes are determined by means of a transmission electron microscope. For improving the characteristics, the ferromagnetic metal powder may contain various additives such as semimetal or non-metal elements (e.g., B, C, Al, Si, P) and their salts or oxides. Usually, the particle surface of the ferromagnetic metal powder is coated with an oxide layer for chemical stabilization.

The tabular hexagonal ferrite powder preferably has a specific surface area of 25 to 65 m$^2$/g, a tabular ratio (diameter/thickness) of 2 to 15, and a particle size (diameter) of 0.02 to 1.0 μm. For the same reason as that described in the ferromagnetic metal powder, the ferrite powder should have a proper size. As the tabular hexagonal ferrite, a tabular ferromagnet having an easy axis of magnetization perpendicular to the tabular plane is favorably employed. Examples of the hexagonal ferrites include barium ferrite, strontium ferrite, lead ferrite, calcium ferrite, and their cobalt-substituted ferrites. Barium ferrite substituted with cobalt and strontium ferrite substituted with cobalt are preferred. The hexagonal ferrite may optionally contain additive elements such as In, Zn, Ge, Nb and V. For ensuring high density recording, the hexagonal ferrite powder preferably has a saturation magnetization (σs) of not less than 50 emu/g (more preferably not less than 53 emu/g) and a coercive force (Hc) of 700 to 2,000 Oe (preferably 900 to 1,600 Oe), as well as the aforementioned size.

The ferromagnetic powder preferably contains water in a content of 0.01 to 2 wt. %, and the water content is preferably adjusted in view of the nature of the binder to be used in combination. Further, the pH value of the ferromagnetic powder is also preferably adjusted in view of the nature of the binder to be used in combination., and generally is in the range of 4 to 12 (preferably 5 to 10). The surface of the powder may be, if needed, partly coated with Al, Si, P or their oxides, or may be treated with the treatment material in an amount of, usually, 0.1 to 10 wt. % based on that of the powder. The coated powder adsorbs a lubricant (such as a fatty acid) in a small amount of not more than 100 mg/m$^2$, and hence satisfying slippage can be obtained with a relatively small amount of the lubricant. Occasionally, the ferromagnetic powder contains water-soluble inorganic ions (e.g., ions of Na, Ca, Fe, Ni and Sr). Even in such case, if the content of the inorganic ions is not more than 500 ppm, the ions do not affect the characteristics of the powder. The content of the ions preferably is as small as possible.

The lubricant can be incorporated into the magnetic layer. The incorporated lubricant comes out onto the surface of the layer, and reduces friction to maintain smooth contact between the magnetic layer and a magnetic head. As the lubricant, for example, fatty acids and fatty acid esters are employed. Examples of the fatty acids include acetic acid, propionic acid, 2-ethyl-hexanoic acid, lauric acid, myristic acid, palmitic acid, stearic acid, behenic acid, arachic acid, oleic acid, elaidic acid, linolic acid, linolenic acid, palmitoleic acid and mixtures of them. Examples of the fatty acid esters include butyl stearate, sec-butyl stearate, isopropyl stearate, butyl oleate, amyl stearate, 3-methylbutyl stearate, 2-ethylhexyl stearate, 2-hexyldecyl stearate, butyl palmitate, butyl palmitate, 2-ethylhexyl myristate, a mixture of butyl stearate and butyl palmitate, oleyl oleate, butoxyethyl stearate, 2-butoxy-1-propyl stearate, dipropylene glycol monobutyl ether acylated with stearic acid, diethylene glycol dipalmitate, diol derived from hexamethylnediol by acylating with myristic acid, and glycerin oleate. These fatty acids and fatty acid esters may be employed singly or in combination. The lubricant can be generally incorporated into the magnetic layer in an amount of 0.2 to 20 weight parts, preferably 0.5 to 10 weight parts, based on 100 weight parts of the ferromagnetic powder.

The carbon black can be generally incorporated into the magnetic layer so as to ensure a low surface electric resistance (Rs), a small kinetic friction coefficient ($\mu_k$ value), good running endurance and smoothness of the surface. The carbon black preferably has a mean particle size (i.e., diameter) of 5 to 350 mμ (more preferably 10 to 300 mμ), and a specific surface area of 5 to 500 m$^2$/g (more preferably 50 to 300 m$^2$/g). The carbon black may comprise a combination of two or more kinds of carbon blacks having different mean particle sizes. Further, the carbon black preferably shows a DBP (dibutyl phthalate) oil absorption in the range of 10 to 1,000 mL/100 g (more preferably 50 to 300 mL/100 g), pH of 2 to 10, a water content of 0.1 to 10%, and a tap density of 0.1 to 1 g/cc.

The carbon black can be any one produced by various processes. For instance, furnace black, thermal black, acetylene black, channel black, and lamp black can be employed. Examples of commercially available carbon black include BLACKPEARLS 2000, 1300, 1000, 900, 800, 700, and VULCAN XC-72 [trade names, available from Cabot Corp.]; #35, #50, #55, #60 and #80 [trade names, available from Asahi Chemical Industry Co., Ltd.]; #3950B, #3750B, #3250B, #2400B, #2300B, #1000, #900, #40, #30 and #10B [trade names, available from Mitsubishi Chemicals Co., Ltd.]; CONDUCTEX SC, RAVEN 150, 50, 40 and 15 [trade names, available from Columbia Carbon Corp.]; and KOETTEN BLACK EC, KOETTEN BLACK ECDJ-500 and KOETTEN BLACK ECDJ-600 [trade names, available from LION AGUZO Co., Ltd.]. The carbon black can be generally incorporated in an amount of 0.1 to 30 weight parts, preferably 0.2 to 15 weight parts, based on 100 weight parts of the ferromagnetic powder.

Examples of the abrasives include melted alumina, silicon carbide, chromium oxide ($Cr_2O_3$), corundum, artificial corundum, diamond, artificial diamond, garnet, and emery (main components: corundum and magnetite). The abrasive generally has a Mohs' scale of hardness of not less than 5 (preferably not less than 6), and preferably has a mean particle size of 0.05 to 1 $\mu$m (more preferably 0.2 to 0.8 $\mu$m, further preferably 0.2 to 0.5 $\mu$m). Into the magnetic layer, the abrasive can be generally incorporated in an amount of 3 to 25 weight parts (more preferably 3 to 20 weight parts) based on 100 weight parts of the ferromagnetic powder.

The binder in the magnetic layer is, for example, thermoplastic resin, thermosetting resin, reactive resin or mixture of them. Examples of the thermoplastic resins include homopolymers or copolymers of vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal, and vinyl ether. Concrete examples of the copolymers include vinyl chloride-vinyl acetate copolymer, vinyl chloride-vinylidene chloride copolymer, vinyl chloride-acrylonitrile copolymer, acrylic ester-acrylonitrile copolymer, acrylic ester-vinylidene chloride copolymer, acrylic ester-styrene copolymer, methacrylic ester-acrylonitrile copolymer, methacrylic ester-vinylidene chloride copolymer, methacrylic ester-styrene copolymer, vinylidene chloride-acrylonitrile copolymer, butadiene-acrylonitrile copolymer, styrene-butadiene copolymer, and chlorovinyl ether-acrylic ester copolymer.

The examples of the thermoplastic resins further include polyamide resin, fiber resin (e.g., cellulose acetate butyrate, cellulose diacetate, cellulose propionate, nitrocellulose), polyvinyl fluoride, polyester or polyurethane and various rubber resins.

Examples of the thermosetting resins and the reactive resins include phenol resin, epoxy resin, polyurethane setting resin, urea resin, melamine resin, alkyd resin, acrylic reactive resin, formaldehyde resin, silicone resin, epoxy-polyamide resin, a mixture of polyester resin and polyisocyanate prepolymer, a mixture of polyester polyol and polyisocyanate, and a mixture of polyurethane and polyisocyanate.

Examples of the polyisocyanates include isocyanates (e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate, triphenylmethanetriisocyanate), products derived from any one of the isocyanates and polyalcohol, and polyisocyanate prepared by condensation reaction of any one of the isocyanates.

Examples of the polyurethanes include polyester-polyurethane, polyether-polyurethane, polyether-polyester polyurethane, polycarbonate-polyurethane, polyester-polycarbonate-polyurethane, and polycaprolactone-polyurethane.

Preferably, the binder in the magnetic layer comprises a combination of polyurethane resin and at least one resin selected from the group consisting of vinyl chloride resin, vinyl chloride-vinyl acetate copolymer, vinyl chloride-vinyl acetate-vinyl alcohol copolymer, vinyl chloride-vinyl acetate-maleic anhydride copolymer, and nitrocellulose. The binder may further include a hardening agent of polyisocyanate.

It is also preferred for the binder to have at least one polar group selected from the group consisting of —COOM, —$SO_3M$, —$OSO_3M$, —P=$O(OM)_2$, —O—P=$O(OM)_2$ (in which M represents a hydrogen atom or an alkaline metal ion), —OH, —$NR_2$, —$N^+R_3$ (in which R represents a hydrocarbyl group), epoxy group, —SH, and —CN. These polar groups can be incorporated into the binder resin by copolymerization or addition reaction. The resin having the polar group disperses the ferromagnetic powder well, and improves the durability of the magnetic layer. The amount of the polar group preferably is in the range of $10^{-1}$ to $10^{-8}$ mol/g (more preferably $10^{-2}$ to $10^{-6}$ mol/g).

In the magnetic layer, the binder is contained in an amount of 5 to 50 weight parts (preferably 10 to 30 weight parts) based on 100 weight parts of the ferromagnetic powder. In the case where the magnetic layer contains, as the binder, a combination of one or more of the vinyl chloride resins, polyurethane resin and polyisocyanate, their amounts are preferably in the ranges of 5 to 70 wt. %, 2 to 50 wt. % and 2 to 50 wt. %, respectively.

The coating dispersion for preparing the magnetic layer may include a dispersing agent so as to disperse well the ferromagnetic powder. Further, other additives such as plasticizer, antistatic agent (electroconductive fine particles other than carbon black) and antiseptics may be optionally incorporated. Examples of the dispersing agents include fatty acid having 12–18 carbon atoms (represented by R—COOH in which R is an alkyl or alkenyl group of 11–17 carbon atoms) such as caprylic acid, capric acid, lauric acid, myristic acid, palmitic acid, stearic acid, behenic acid, oleic acid, elaidic acid, linoleic acid, linolenic acid and stearolic acid; metallic soap derived from the fatty acid and alkaline metal or alkaline earth metal; fluorine-containing ester of the fatty acid; amide of the fatty acid; polyalkylene oxide alkylphosphate; lecithin; trialkylpolyolefinoxy quaternary ammonium salt (in which the alkyl group has 1–5 carbon atoms, and the olefin is, for example, ethylene or propylene); sulfates; and copper phthalocyanine. These compounds may be employed singly or in combination. The dispersing agent is generally added in an amount of 0.5 to 20 weight parts based on 100 weight parts of the binder.

The back-coat layer comprises carbon black and binder, and further an inorganic powder and a lubricant are preferably incorporated. Preferably, the carbon black comprises a combination of two kinds of carbon blacks having different mean particle sizes (i.e., diameters). One carbon black consists essentially of relatively fine particles having a mean particle size of 10 to 20 m$\mu$ (carbon black I), and the other consists essentially of relatively crude particles having a mean particle size of 230 to 300 m$\mu$ (carbon black II). The carbon black I having such a relatively small particle size imparts a low surface electric resistance to the back-coat layer. Further, the carbon black I gives a low light transmittance to the layer, and hence is advantageously employed for the magnetic tape in the recording system working according to actuating signals based on the transmittance of the tape. Moreover, the carbon black I can reduce a friction coefficient efficiently when it is employed in combination with a liquid lubricant, because the carbon black I having the small particle size can well retain the liquid lubricant on its surface. The carbon black II having a relatively large particles size can serve as solid lubricant and further form protrusions of small sizes on the surface of the back-coat layer. Such small size protrusions can reduce the total area of contact between the back-coat layer and the support members (for instance, guide poles) of the recording device. The reduced contact area results in reducing the friction coefficient between the back-coat layer and the support members.

Examples of commercially available fine carbon blacks (carbon black I) include RAVEN 2000 (18 mµ) and 1500B (17 mµ) [trade names, available from Columbia Carbon Corp.]; BP 800 (17 mµ) [trade name, available from Cabot Corp.]; PRINTEX 90 (14 mµ), PRINTEX 95 (15 mµ), PRINTEX 85 (16 mµ), and PRINTEX 75 (17 mµ) [trade names, available from Dexa Corp.]; and #3950 (16 mµ) [trade name, available from Mitsubishi Chemicals Co., Ltd.]. Examples of commercially available crude carbon blacks (carbon black II) include THERMAL BLACK (270 mµ) [trade name, available from Carncarp Corp.] and RAVEN MTP (275 mµ) [trade name, available from Columbia Carbon Corp.].

The ratio of the carbon black I to the carbon black II preferably is 98/2 to 75/25 (by weight), more preferably 95/5 to 85/15. The total amount of carbon black(s) in the back-coat layer generally is in the range of 30 to 110 weight parts, preferably 50 to 90 weight parts, based on 100 weight parts of the binder.

In order to reinforce the back-coat layer and to enhance the running durability of the tape, the back-coat layer may contain an inorganic material powder having Mohs' scale of hardness of 5 to 9. The back-coat layer containing the inorganic powder together with the carbon black is hardly frayed even if it is repeatedly used. Further, the inorganic material powder reduces wastes attaching to the supporting members (e.g., guide pole) with which the magnetic tape runs in contact, because the powder works as a moderate abrasive. The inorganic material powder preferably has a mean particle size of 80 to 250 mµ (more preferably 100 to 210 mµ).

Examples of the inorganic material powders having Mohs' scale of hardness of 5 to 9 include α-iron oxide, α-alumina and chromium oxide ($Cr_2O_3$). These compounds may be used singly or in combination. Preferred are α-iron oxide and α-alumina. The amount of the inorganic material powder is generally in the range of 3 to 30 weight parts, preferably 3 to 20 weight parts, based on 100 weight parts of the carbon black.

The lubricants described for the magnetic layer are also employable for the back-coat layer. The back-coat layer preferably contains the lubricant in an amount of 1 to 5 weight parts based on 100 weight parts of the binder. Further, the back-coat layer may contain the dispersing agent described for the magnetic layer in the same amount as that in the magnetic layer.

The binders described for the magnetic layer are also employable for the back-coat layer. Examples of the binders include nitrocellulose resin, vinyl chloride resins, phenoxy resin, polyurethane resin, polyester resin, and polyisocyanate (hardening agent). As the binder in the back-coat layer, vinyl chloride resins and/or phenoxy resin (in an amount of 40 to 90 wt. %, preferably 55 to 80 wt. % based on the total amount of the binder), polyurethane resin, polyester resin, and polyisocyanate (hardening agent) are preferably employed in combination. Since vinyl chloride resins and phenoxy resin less shrink than nitrocellulose, they reduce the lateral curl of the magnetic tape. The back-coat layer contains the binder in an amount of 5 to 250 weight parts (preferably 10 to 200 weight parts) based on 100 weight parts of the carbon black.

Next, the magnetic tape of the second embodiment is explained below.

The tape of the second embodiment has a structure similar to that of the first embodiment, except that a non-magnetic layer is provided between the support web and the magnetic layer. Therefore, other than the non-magnetic layer, the components of the second embodiment may be the same as those described for the first embodiment.

The non-magnetic layer comprises a non-magnetic powder and a binder, and is essentially non-magnetic. The non-magnetic layer is required to be non-magnetic in order not to affect the electromagnetic characteristics of the magnetic layer provided thereon. However, if it does not give any adverse effect to them, the non-magnetic layer may contain a small amount of a magnetic powder. Usually, the non-magnetic layer further contains a lubricant.

The non-magnetic powder incorporated in the non-magnetic layer is, for example, a non-magnetic inorganic powder or carbon black. The non-magnetic powder preferably has Mohs' scale of hardness of 5 or higher (more preferably 6 or higher), and can be α-alumina, β-alumina, γ-alumina, carbon silicate, chromium oxide, cerium oxide, α-iron oxide, corundum, silicon nitride, titanium carbide, titanium dioxide, silicon dioxide, boron nitride, zinc oxide, calcium carbonate, calcium sulfate, or barium sulfate. These can be used singly or in combination. Preferred are titanium dioxide, α-alumina, α-iron oxide, and chromium oxide. The non-magnetic inorganic powder preferably has a mean particle size of 0.01 to 1.0 µm (more preferably 0.01 to 0.5 µm, specifically preferably 0.02 to 0.1 µm).

The carbon black imparts appropriate electroconductivity to the non-magnetic layer, so as to keep the layer from static electricity and further to improve smoothness of the surface of the magnetic layer arranged thereon. Examples of carbon black for incorporation into the non-magnetic layer are those described before for the magnetic layer. The particle size of carbon black for the non-magnetic layer preferably is not more than 35 mµ (more preferably in the range of 10 to 35 mµ). The carbon black can be incorporated into the non-magnetic layer in an amount of 3 to 20 weight parts, preferably 4 to 18 weight parts, more preferably 5 to 15 weight parts, based on 100 weight parts of the non-magnetic powder.

The non-magnetic layer may further contain a lubricant such as a fatty acid or a fatty acid ester. Examples of the lubricants employable for the non-magnetic layer are those described before for the magnetic layer of the first embodiment. The lubricant can be employed in an amount of 0.2 to 20 weight parts based on 100 weight parts of the non-magnetic powder in the non-magnetic layer.

The binder described before for the magnetic layer can be also employed for the non-magnetic layer. The non-magnetic layer preferably comprises the binder in an amount of 5 to 50 weight parts (more preferably 10 to 30 weight parts) based on 100 weight parts of the non-magnetic powder. In the case where the non-magnetic layer contains, as the binder, a combination of one or more of the vinyl chloride resins, polyurethane resin and polyisocyanate, the amounts of them are preferably in the ranges of 5 to 70 wt. %, 2 to 50 wt. % and 2 to 50 wt. %, respectively. The non-magnetic layer may further contain the optional components described before for the magnetic layer.

The following is a description of the process for producing the magnetic tape of the invention.

Besides the conventional procedures for producing a magnetic tape, the production process comprises the heating procedure for reducing curls in the longitudinal and width directions. The heating procedure is preferably conducted before the calendering processing (after drying) or after the calendering processing, or it may be twice performed both before and after the calendering processing.

The magnetic tape of the invention can be produced by the following steps.

[Step 1]

i) Coating solutions (dispersions) for forming the magnetic layer, the non-magnetic layer, and the back-coat layer are independently prepared.

ii) On one surface of the support web, the coating solution for the magnetic layer (the first embodiment) or both solutions for the magnetic and non-magnetic layers (the second embodiment) are applied.

In producing the tape of the second embodiment, the coating method is not particularly restricted. However, the magnetic layer is preferably prepared by the so-called "wet-on-wet process" or "simultaneous double coating", in which the magnetic layer is formed on the non-magnetic layer while the non-magnetic layer is still wet. The wet-on-wet process is performed, for example, by applying the coating dispersion for preparing the magnetic layer onto the non-magnetic layer which is still wet.

A variety of procedures for conducting the wet-on-wet process are described in the following U.S. Patents and Japanese patent publications:

(1) U.S. Pat. Nos. 4,681,062, 4,480,583 and 5,302,206 for gravure coating, roller coating, blade coating, and extrusion coating;

(2) U.S. Pat. Nos. 4,854,262, 5,030,484 and 5,302,206 for simultaneous coating by means of a coating device comprising two slits in a single coating head; and (3) Japanese Patent Provisional Publication No. 2(1990)-174965 for simultaneous coating by means of an extrusion coating device equipped with a back-up roller.

iii) The formed magnetic and non-magnetic layers are then dried.

[Step 2]

iv) On the other surface of the support web, the coating solution for the back-coat layer is applied to form the back-coat layer.

v) The formed layer is dried.

Thus, a wide and long magnetic recording medium of multi-layered body is prepared.

[Step 3]

vi) The multi-layered medium is subjected to the heating procedure I.

The heating procedure I is preferably performed while the medium is continuously running and strained at a tension of 1 to 5 kg/m at a temperature of 80 to 150° C. (more preferably 85 to 130° C.). The time for heating is determined in consideration of the temperature, and is preferably short enough not to harden each layer too much. Generally, the time is in the range of 1 second to 1 minute (more preferably 1 second to 30 seconds).

vii) The multi-layered medium is wound up to form a roll.

viii) The calendering processing is performed.

[Step 4]

ix) The multi-layered medium is subjected to the heating procedure II.

The roll of the medium is stored for a long time at a relatively low temperature to perform the heating procedure II. In the form of roll, the medium is strained at a tension of 2 to 5 kg/m. The temperature and the time for the procedure are preferably in the ranges of 60 to 80° C. and 15 to 70 hours (more preferably 20 to 50 hours), respectively.

x) The medium is cut to give a narrow magnetic tape having a desired width.

xi) The magnetic tape is encased in a desired cartridge.

The surface conditions of the back-coat layer are often transferred onto that of the magnetic layer while the magnetic tape is stored in the form of a roll, and hence the back-coat layer preferably has a smooth surface. Preferably, the back-coat layer has a surface roughness (Ra) of 0.0030 to 0.060 µm (average roughness at the center of cut-off 0.08 mm). In the calendering processing performed after applying the coating solution, the surface roughness can be adjusted by selecting the material, the surface state and the pressure of the calender roll.

In the first embodiment, the thickness of the magnetic layer preferably is in the range of 1.0 to 3.0 µm (more preferably 1.2 to 2.5 µm, further preferably 1.5 to 2.5 µm). The magnetic tape of the first embodiment has a total thickness of 3 to 10 µm (preferably 4.0 to 9.5 µm, more preferably 4.5 to 9.0 µm, further preferably 5.0 to 8.5 µm). The back-coat layer preferably has a thickness of 0.1 to 1.0 µm (preferably 0.2 to 0.8 µm, more preferably 0.3 to 0.6 µm).

In the second embodiment, the thicknesses of the magnetic and non-magnetic layers are in the ranges of 0.05 to 1.0 µm (preferably 0.1 to 1.0 µm, more preferably 0.1 to 0.5 µm, further preferably 0.1 to 0.4 µm) and 0.5 to 2.5 µm (preferably 1.0 to 2.5 µm, more preferably 1.5 to 2.0 µm, further preferably 1.5 to 1.8 µm), respectively. The thickness ratio of the magnetic layer to the non-magnetic layer preferably is in the range of ½ to ¹/₁₅ (more preferably ⅓ to ¹/₁₀). Preferably, the total thickness and the thickness of the back-coat layer of the second embodiment are in the same ranges as those of the first embodiment.

The present invention is further described by the following examples and comparison examples. In these examples, "part(s)" means "part(s) by weight".

EXAMPLE 1

Coating Dispersion for Preparing Magnetic Layer (Components for the Magnetic Layer)

| | |
|---|---|
| Ferromagnetic metal powder (coercive force (Hc): 1650 Oe specific surface area (BET): 56 m²/g crystallite size: 170 angstroms saturation magnetization (σs): 130 emu/g grain size (mean diameter along the major axis): 0.2 µm aspect ratio: 7.0, pH: 9.0 water soluble Na: 70 ppm water soluble Ca: 10 ppm water soluble Fe: 10 ppm) | 100 parts |
| Surface treatment agent (phenylsulfonic acid) | 3 parts |
| Vinyl chloride copolymer having polar groups (—SO₃K) (MR-110 [trade name] available from Nippon Zeon Co., Ltd. polymerization degree: 350 content of —SO₃K group: 5 × 10⁻⁶ mol/g content of epoxy group: 3.5 wt. % in terms of monomer unit) | 10 parts |

-continued

| | |
|---|---|
| Polyester-polyurethane resin having polar group (—SO$_3$Na) (neopentylglycol/caprolactone polyol/ diphenyl-methane-4,4'-diisocyanate (MDI) = 0.9/2.6/1, by weight, content of —SO$_3$Na group: 1 × 10$^{-4}$ mol/g) | 2.5 parts |
| α-Alumina (particle size: 0.3 μm) | 10 parts |
| Cr$_2$O$_3$ | 1 part |
| Carbon black (particle size: 0.10 μm) | 3 parts |
| Methyl ethyl ketone | 150 parts |
| Cyclohexanone | 50 parts |

All ingredients were kneaded in a continuous kneader and dispersed in a sand mill. The resulting dispersion was mixed with 2.5 parts of polyisocyanate (Colonate L [trade name], available from Nippon Polyurethane Industries, Ltd.) and the following components. The mixture was passed through a filter having a mean pore size of 1 μm, to give a coating dispersion for preparing the magnetic layer.

| | |
|---|---|
| Butyl stearate | 1 part |
| Stearic acid | 2 parts |
| Oleic acid | 1 part |
| Toluene | 40 parts |
| [Coating Dispersion for Preparing Back-coat layer] (Components for the back-coat layer) | |
| Carbon black I (BP-800 [trade name], available from Cabot Corp. mean particle size: 17 mμ) | 100 parts |
| Carbon black II (THERMAL BLACK [trade name], available from Carncarp Corp.; mean particle size: 270 mμ) | 10 parts |
| α-Alumina (inorganic powder) (mean particle size: 200 mμ Mohs' scale of hardness: 9) | 5 parts |
| Nitrocellulose resin | 140 parts |
| Polyurethane resin | 5 parts |
| Polyisocyanate (Colonate L [trade name], available from Nippon Polyurethane Industries, Ltd.) | 40 parts |
| Polyester resin | 5 parts |
| Dispersant: copper oleate | 5 parts |
| copper phthalocyanine | 5 parts |
| barium sulfate (BF-1 [trade name], available from Sakai Chemical Co., Ltd. mean particle size: 50 mμ Mohs' scale of hardness: 3) | 5 parts |
| Methyl ethyl ketone | 2,200 parts |
| Butyl acetate | 300 parts |

All ingredients were kneaded in a continuous kneader and dispersed in a sand mill. The resulting dispersion was well mixed with 600 parts of toluene. The mixture was passed through a filter having a mean pore size of 1 μm, to give a coating dispersion for preparing the back-coat layer.

Preparation of Magnetic Tape

[Step 1]

On a polyethylene naphthalate (PEN) support web [thickness: 6.0 μm, Young's modulus in the longitudinal direction (machine direction: MD): 900 kg/mm$^2$, Young's modulus in the width direction (transverse direction: TD): 580 kg/mm$^2$, central surface roughness (Ra): 6 nm (cut-off value: 0.25 mm)], the coating dispersion for magnetic layer was applied so that the formed layer might have a thickness of 2.0 μm in terms of thickness after dryness. While the magnetic layer is still wet, the layer was treated successively with a cobalt magnet having a magnetic flux density of 3,000 gauss and a solenoid having a magnetic flux density of 1,500 gauss for orientation. Thus treated layer was dried to give a magnetic layer.

[Step 2]

The coating dispersion for the back-coat layer was applied on the surface of the support web opposite to the surface on which the magnetic layer was provided, to give a back-coat layer having a thickness of 0.4 μm (in terms of thickness after dryness). Thus, a magnetic recording medium was produced in the form of a roll.

[Step 3]

The magnetic recording medium was made to run at the tension of 3.0 kg/m through a heating zone of 110° C. for 5 sec. (heating procedure I), and then subjected to calendaring (temperature: 90° C., linear pressure 300 kg/cm$^2$) using a calendaring machine comprising seven nips, each of which comprises a pair of metal rollers only. Thus calendared medium was wound up at a tension of 5 kg/m.

[Step 4]

The roll of the medium is stored for 48 hours at 70° C. to perform the heating procedure II, and then slit to give a magnetic tape of the invention for recording computer data (width: 0.5 inch). The magnetic tape was then encased in a ½ inch IBM 3480 cartridge (tape length: 580 m).

EXAMPLES 2 AND 3

The procedures of Example 1 were repeated except for applying the coating dispersion for back-coat layer so that the formed layer might have a thickness of 0.3 μm (Example 2) or 0.5 μm (Example 3) in terms of thickness after dryness. Thus, magnetic tapes of the invention were produced.

EXAMPLE 4

The procedures of Example 1 were repeated except for employing a polyethylene naphthalate (PEN) support web [thickness: 6.0 μm, Young's modulus in the longitudinal direction (MD): 800 kg/mm$^2$, Young's modulus in the width direction (TD): 650 kg/mm$^2$], to produce a magnetic tape of the invention.

EXAMPLE 5

The procedures of Example 1 were repeated except for using vinyl chloride copolymer having polar groups [polymerization degree: 350; content of —SO$_3$K group: 5×10$^{-6}$ mol/g; content of epoxy group: 3.5 wt. % in terms of monomer unit] in place of nitrocellulose resin in the back-coat layer, to produce a magnetic tape of the invention.

EXAMPLE 6

The procedures of Example 1 were repeated except for using phenoxy resin (PKHH, available from Union Carbide Inc.,) in place of nitrocellulose resin in the back-coat layer, to produce a magnetic tape of the invention.

COMPARISON EXAMPLE 1

The procedures of Example 1 were repeated except for applying the coating dispersion for back-coat layer so that the formed layer might have a thickness of 0.7 μm in terms of thickness after dryness. Thus, a magnetic tape for comparison was produced.

COMPARISON EXAMPLE 2

The procedures of Example 1 were repeated except for employing a polyethylene terephthalate (PET) support web [thickness: 6.0 μm, Young's modulus in the longitudinal direction (MD): 760 kg/mm², Young's modulus in the width direction (TD): 400 kg/mm²], to produce a magnetic tape for comparison.

COMPARISON EXAMPLE 3

The procedures of Example 1 were repeated except for employing another polyethylene naphthalate (PEN) support [thickness: 6.0 μm, Young's modulus in the longitudinal direction (MD): 700 kg/mm², Young's modulus in the width direction (TD): 750 kg/mm²], to produce a magnetic tape for comparison.

COMPARISON EXAMPLE 4

The procedures of Example 1 were repeated without performing the heating procedures I and II in Steps 3 and 4, to produce a magnetic tape for comparison.

COMPARISON EXAMPLE 5

The procedures of Example 1 were repeated except for performing the heating procedure I in Step 3 at a tension of 7 kg/m, to produce a magnetic tape for comparison.

COMPARISON EXAMPLE 6

The procedures of Example 1 were repeated except for performing the heating procedure II in Step 4 at a temperature of 40° C., to produce a magnetic tape for comparison.

The characteristics of the prepared tape are set forth in Table 1.

TABLE 1

| | α | b.c. layer | | support web | | | |
|---|---|---|---|---|---|---|---|
| | (μm) | β (μm) | binder | MD | TD | MD/TD | material |
| Ex. 1 | 8.4 | 0.4 | A | 900 | 580 | 1.55 | PEN |
| Ex. 2 | 8.3 | 0.3 | A | 900 | 580 | 1.55 | PEN |
| Ex. 3 | 8.5 | 0.5 | A | 900 | 580 | 1.55 | PEN |
| Ex. 4 | 8.4 | 0.4 | A | 800 | 650 | 1.23 | PEN |
| Ex. 5 | 8.4 | 0.4 | B | 900 | 580 | 1.55 | PEN |
| Ex. 6 | 8.4 | 0.4 | C | 900 | 580 | 1.55 | PEN |
| Com. 1 | 8.7 | 0.7 | A | 900 | 580 | 1.55 | PEN |
| Com. 2 | 8.4 | 0.4 | A | 760 | 400 | 1.9 | PET |
| Com. 3 | 8.4 | 0.4 | A | 700 | 750 | 0.93 | PEN |
| Com. 4 | 8.4 | 0.4 | A | 900 | 580 | 1.55 | PEN |
| Com. 5 | 8.4 | 0.4 | A | 900 | 580 | 1.55 | PEN |
| Com. 6 | 8.4 | 0.4 | A | 900 | 580 | 1.55 | PEN |

Remarks)
α: total thickness of the magnetic tape;
β: thickness of the back-coat layer;
Binder of the back-coat layer:
A: a binder mainly comprising nitrocellulose resin,
B: a binder mainly comprising vinyl chloride copolymer having the polar groups, and
C: a binder mainly comprising phenoxy resin;
MD: Young's modulus (kg/mm²) of the support web in the longitudinal or machine direction;
TD: Young's modulus (kg/mm²) of the support web in the width or transverse direction; and
MD/TD: the ratio of MD to TD.

Magnetic Recording-Reproducing System
(1) Thin-film Magnetic Heads
  a) Recording Head
  structure: inductive head comprising 2-turn thin-film coil provided between amorphous Co magnetic thin-film yokes,
  track width: 25 μm,
  gap length: 1.0 μm.

b) Reproducing Head
  structure: SAL bias magnetoresistive reproducing head (Fe/Ni Permalloy thin film) having double shields
  track width: 12.5 μm
  shield length: 0.3 μm
(2) Constitution of System
  The heads were incorporated in a recording-reproducing apparatus (F613A drive [trade name], available from Fujitsu, Ltd.) which is ½ inch IBM 3480 magnetic tape drive to compose a recording-reproducing system.

Evaluation of Magnetic Tape

The prepared magnetic tapes were evaluated from the following viewpoints.
(1) Radius of Curvature of Curl in the Longitudinal Direction The magnetic tape having the width of ½ inch (1.27 cm) was cut into a strip having the length of 1 m. One end of the strip was fixed, and the other was made free. Then, the strip was suspended for 3 hours under the testing conditions (23° C.±2° C., 50%±10% RH). From the strip, the portion between the center and 35 mm below was cut out to prepare a sample. The sample was placed on a plane under the condition that one side edge was brought into contact with the plane, and allowed to form a curl in the longitudinal direction. The radius of curvature of the formed curl was measured.
(2) Radius of Curvature of Curl in the Width Direction The magnetic tape having the width of ½ inch (1.27 cm) was cut into a strip having the length of 1 m. One end of the strip was fixed, and the other was made free. Then, the strip was suspended for 3 hours under the testing conditions (23° C.±2° C., 50%±10% RH). From the strip, the upper 250 mm portion and the lower 250 mm portion are cut off to give a sample of 500 mm length. One end of the sample was fixed so that the magnetic layer side might be placed upside, and a 3.5 g weight was connected at the other end. As shown in FIG. 1, the sample was then strained via a roller (diameter: 10 mm). The distance between the fixed end and the center of the roller was adjusted at 200 mm. At the position of 100 mm from the fixed end, the lateral distance between the center and the edge was measured by scanning an optical displacement meter in the width direction. From the obtained distance and the width of the tape, the radius of curvature of curl in the width direction was calculated.
(3) Wrong Winding in the Step for Slitting In the step for slitting, it was observed whether wrong winding occurred.
(4) Output Power Given by Center of Track The magnetic tape was installed in the recording-reproducing system, and made to run (tape speed: 2 m/second; tension: 100 g). The recording and reproducing heads were placed on the magnetic tape at a position of 6.3 mm inside from the lower edge, and then a signal having a wavelength of 0.54 μm was recorded. While the recorded signal was reproduced, the output power was measured. The measured power of each sample was evaluated in terms of a relative value under the condition that the power given by the tape of Example 1 is set to 100%.
(5) Output Power Given by Edge of Track The magnetic tape was installed in the recording-reproducing system, and made to run (tape speed: 2 m/second; tension: 100 g). The recording and reproducing heads were placed on the magnetic tape at a position of 0.8 mm inside from the lower edge, and then a signal having a wavelength of 0.54 μm was recorded. While the recorded signal was reproduced, the output power was measured. The measured power of each sample was calculated in the same manner as that described in (4).

(6) Vertical Movement of Running Tape

The magnetic tape was installed in the recording-reproducing system, and made to run (tape speed: 2 m/second; tension: 100 g). On a reel of the reproducing head machine, vertical movement of the running tape was measured by detecting the position of the upper edge with an optical sensor. The degree of the movement was expressed according to the difference (μm) between the maximum and minimum positions of the upper edge while the tape was running forward and backward (tape was run once in the forward running and the back ward running).

(7) Total Thickness of Magnetic Tape

Ten magnetic tapes were superposed, and the thickness of the superposed magnetic tapes was measured by means of a micrometer to determine the thickness of magnetic tape.

The results are set forth in Table 2.

TABLE 2

|  | curvature radius | | | output power | | vertical |
| --- | --- | --- | --- | --- | --- | --- |
|  | LO (mm) | LA (mm) | winding | center | edge | move. |
| Ex. 1 | 20 | 50 | good | 100% | 96% | 5 μm |
| Ex. 2 | 25 | 65 | good | 100% | 98% | 4 μm |
| Ex. 3 | 18 | 42 | good | 98% | 94% | 6 μm |
| Ex. 4 | 25 | 55 | good | 97% | 97% | 4 μm |
| Ex. 5 | 25 | 180 | good | 100% | 99% | 2 μm |
| Ex. 6 | 20 | 180 | good | 100% | 99% | 2 μm |
| Com. 1 | 16 | 30 | good | 96% | 75% | 62 μm |
| Com. 2 | 6 | 48 | wrong | 75% | 73% | 6 μm |
| Com. 3 | 8 | 52 | wrong | 78% | 77% | 5 μm |
| Com. 4 | 6 | 30 | wrong | 75% | 62% | 55 μm |
| Com. 5 | 8 | 38 | wrong | 78% | 70% | 40 μm |
| Com. 6 | 7 | 33 | wrong | 78% | 70% | 35 μm |

Remarks)
LO: the radius of curvature in a longitudinal direction; and
LA: the radius of curvature in a curl in the width direction.
In each magnetic tape, the curl in the width direction is made to give a convex on the magnetic layer side.

LO: the radius of curvature in a curl in the longitudinal direction; and

LA: the radius of curvature in a curl in the width direction.

In each magnetic tape, the curl in the width direction is made to give a convex on the magnetic layer side.

The results set forth in Table 2 indicate the following facts.

The samples according to the invention (Examples 1 to 6), in which the curls in the longitudinal and width direction have radiuses of curvature satisfying the conditions of the invention, show small depression of the output power both at the center and at the edge of the magnetic tape. This means that these samples have excellent electromagnetic characteristics. Further, they vertically move while running in such slight degrees that they can keep stable running. Moreover, since troubles in winding hardly occur, they are easily handled. The samples of Examples 5 and 6 particularly exhibit very small curl in the width direction, and accordingly give very small output depression and small vertical movement. This is because nitrocellulose, which shrinks a lot, is not used in the back-coat layers of Examples 5 and 6.

On the other hand, the magnetic tape of Comparison Example 1 shows large output depression and give noticeable vertical movement while running in a certain degree. This is because the tape has a thick back-coat layer. The thick layer shrinks to form a curl in the width direction, and the large curl in the width direction disturbs the contact between the edge track and the head to impair the output. Further, because of the large curl in the width direction, guide apparatuses have such insufficient control on running that the tape vertically moves in a certain degree. The curl in the longitudinal direction, however, is not so large that wrong winding does not occur.

The magnetic tapes of Comparison Examples 2 and 3 exhibit large curls in the longitudinal direction because their supports have small Young's modulus in the longitudinal direction. The large curl in the longitudinal direction prevents the center and edge track from contacting to the magnetic head, so as to impair the output. Further, it also causes wrong winding. However, since the curls in the width direction of these tapes are relatively small, the magnetic tapes vertically move in slight degrees.

The magnetic tapes of Comparison Examples 4 and 5 exhibit large curl in both the longitudinal and width directions, and therefore the curl in the longitudinal direction prevents the center and edge track from contacting to the magnetic head, so as to impair the output. Further, wrong winding occurs and the tapes vertically move while running in certain degrees.

EXAMPLE 7

The coating dispersions for magnetic layer and for back-coat layer were prepared in the same manner as that described in Example 1.

[Coating Dispersion for Preparing Non-magnetic Layer]
(Components for the non-magnetic layer)

| | |
| --- | --- |
| Non-magnetic powder (titanium dioxide) | 90 parts |
| (rutile type, $TiO_2$ content: higher than 90% | |
| mean primary particle size: 0.035 μm | |
| specific surface area (BET): 40 m$^2$/g | |
| pH: 7.0 | |
| DBT (dibutyl phthalate) absorption: 27–38 g/100 g | |
| Mohs' scale of hardness: 6.0 | |
| having a surface covered with 1.5 wt. % of $Al_2O_3$) | |
| Carbon black | 10 parts |
| (available from Mitsubishi Carbon Co., Ltd. | |
| mean primary particle size: 16 μm | |
| DBT absorption: 80 mL/100 g | |
| pH: 8.0 | |
| specific surface area (BET): 250 m$^2$/g | |
| volatile content: 1.5%) | |
| Vinyl chloride copolymer having polar | 12 parts |
| groups (—$SO_3K$, epoxy group) | |
| (MR-110 [trade name], available from Nippon | |
| Zeon Co., Ltd.) | |
| Polyester-polyurethane resin having a polar | 5 parts |
| group (—$SO_3Na$) | |
| (neopentylglycol/caprolactone polyol/diphenylmethane-4,4'- | |
| diisocyanate (MDI) = 0.9/2.6/1, weight ratio, | |
| content of —$SO_3Na$ group: $1 \times 10^{-4}$ mol/g) | |
| Methyl ethyl ketone | 150 parts |
| Cyclohexanone | 50 parts |

All ingredients were kneaded in a continuous kneader and dispersed in a sand mill. The resulting dispersion was mixed with 3 parts of polyisocyanate (Colonate L, available from Nippon Polyurethane Industries, Ltd.) and the following components. The mixture was passed through a filter having a mean pore size of 1 μm, to give a coating dispersion for preparing the non-magnetic layer.

| | |
| --- | --- |
| Butyl stearate | 1 part |
| Stearic acid | 2 parts |

-continued

| | |
|---|---|
| Oleic acid | 1 part |
| Toluene | 40 parts |
| Butyl acetate | 40 parts |

Preparation of Magnetic Tape

The procedures of Example 1 were repeated except that the coating dispersions for non-magnetic layer and magnetic layer were applied on the same support web as that in Example 1 by simultaneous double coating method, so that the non-magnetic and magnetic layers might have the thicknesses of 1.8 μm and 0.2 μm, respectively, in terms of thickness after dryness. Thus, a magnetic tape of the invention for recording computer data was prepared. The prepared magnetic tape has a total thickness of 8.4 μm.

COMPARISON EXAMPLE 7

The procedures of Example, 7 were repeated except for employing a polyethylene naphthalate (PEN) support web [thickness: 6.0 μm, Young's modulus in the longitudinal direction (MD): 700 kg/mm$^2$, Young's modulus in the width direction (TD): 400 kg/mm$^2$], to produce a magnetic tape for comparison. The prepared magnetic tape has a total thickness of 8.4 μm.

Evaluation of Magnetic Tape

The prepared magnetic tapes were evaluated in the aforementioned manner.

The results are set forth in Table 3.

TABLE 3

| | curvature radius | | | output power | | vertical |
|---|---|---|---|---|---|---|
| | LO (mm) | LA (mm) | winding | center | edge | move. |
| Ex. 7 | 20 | 48 | good | 140% | 135% | 5 μm |
| Com. 7 | 8 | 55 | wrong | 90% | 85% | 5 μm |

Remarks)
LO: the radius of curvature in a curl in the longitudinal direction; and
LA: the radius of curvature in a curl in the width direction.
In each magnetic tape, the curl in the width direction made the magnetic layer side convex.

The results set forth in Table 3 indicate the following facts.

The sample according to the invention (Example 7), in which the curls in the longitudinal and width directions have radiuses of curvature satisfying the conditions of the invention, has excellent electromagnetic characteristics. Further, the tape vertically moves while running in such a slight degree that it can keep stable running. Moreover, since troubles in winding hardly occur, it is easily handled. On the other hand, since the magnetic tape of Comparison Example 7 employs a support web having a low Young's modulus, a curl is liable to form in the longitudinal direction. The curl inhibits the contact between the tape and the head, and consequently impairs the output. Further, the curl causes wrong winding to make the handling procedure worse.

What is claimed is:

1. A magnetic tape having a thickness of 3 to 10 μm, which comprises a support web, a magnetic layer which is placed on a surface on one side of the support web and comprises a ferromagnetic powder and a binder, and a back-coat layer which is placed on a surface on another side of the support web and comprises carbon black and a binder, which shows a curl having a radius of curvature of 10–25 mm in its longitudinal direction, said curl being measured by standing the magnetic tape having a length of 35 cm on a plane under the condition that one side edge is brought into contact with the plane, and a curl having a radius of curvature of 40–180 mm in its width direction, said curl in the width direction giving a convex surface on the side of the magnetic layer.

2. The magnetic tape of claim 1, wherein the support web has a Young's modulus of 750 to 950 kg/mm$^2$ in its longitudinal direction and a Young's modulus in its width direction, the ratio of the former Young's modulus to the latter Young's modulus being in the range of 1.1 to 1.8.

3. The magnetic tape of claim 1, wherein the support web has a thickness in the range of 3.0 to 7.0 μm.

4. The magnetic tape of claim 1, wherein the back-coat layer has a thickness in the range of 0.3 to 0.6 μm.

5. The magnetic tape of claim 1, wherein the binder of the back-coat layer comprises at least one resin selected from the group consisting of nitrocellulose resin, vinyl chloride resin, and a phenoxy resin.

6. The magnetic tape of claim 1, wherein the carbon black of the back-coat layer comprises one carbon black having an average diameter of 10 to 20 mμ and another carbon black having an average diameter of 230 to 300 mμ.

7. A magnetic tape having a thickness of 3 to 10 μm, which comprises a support web, a non-magnetic layer which is placed on a surface on one side of the support web, has a thickness of 0.3 to 2.5 μm and comprises a non-magnetic powder and a binder, a magnetic layer which is placed on the non-magnetic layer, has a thickness of 0.05 to 1.0 μm and comprises a ferromagnetic powder and a binder, and a back-coat layer which is placed on a surface on another side of the support web which comprises carbon black and a binder, which shows a curl having a radius of curvature of 10–25 mm in its longitudinal direction, said curl being measured by standing the magnetic tape having a length of 35 cm on a plane on the condition that one side edge is brought into contact with the plane, and a curl having a radius of curvature of greater than 40–180 mm in its width direction, said curl in the width direction giving a convex surface on the side of the magnetic layer.

8. The magnetic tape of claim 7, wherein the support web has a Young's modulus of 750 to 950 kg/mm$^2$ in its longitudinal direction and a Young's modulus in its width direction, the ratio of the former Young's modulus to the latter Young's modulus being in the range of 1.1 to 1.8.

9. The magnetic tape of claim 7, wherein the support web has a thickness in the range of 3.0 to 7.0 μm.

10. The magnetic tape of claim 7, wherein the back-coat layer has a thickness in the range of 0.3 to 0.6 μm.

11. The magnetic tape of claim 7, wherein the binder of the back-coat layer comprises at least one resin selected from the group consisting of nitrocellulose resin, vinyl chloride resin, and a phenoxy resin.

12. The magnetic tape of claim 7, wherein the carbon black of the back-coat layer comprises one carbon black having an average diameter of 10 to 20 mμ and another carbon black having an average diameter of 230 to 300 mμ.

13. The magnetic tape of claim 1, wherein the support web comprises polyethylene naphthalate.

14. The magnetic tape of claim 7, wherein the support web comprises polyethylene naphthalate.

15. The magnetic tape of claim 1, wherein the curl in the longitudinal direction is measured on a tape sample of 35 cm length which is prepared by cutting out of the magnetic tape of one meter length between a center thereof and 35 cm below, which is suspended for 3 hours under the testing conditions of one end thereof being fixed, another end being free, 23° C.±2° C. and 50%±2% relative humidity.

16. The magnetic tape of claim 7, wherein the curl in the longitudinal direction is measured on a tape sample of 35 cm length which is prepared by cutting out of the magnetic tape of one meter length between a center thereof and 35 cm below, which is suspended for 3 hours under the testing conditions of pne end thereof being fixed, another end being free, 23° C.±2° C. and 50%±2% relative humidity.

* * * * *